United States Patent

[11] 3,542,260

| [72] | Inventor | Augustine A. Souza |
| | | San Jose, California |
| [21] | Appl. No. | 785,127 |
| [22] | Filed | Dec. 19, 1868 |
| [45] | Patented | Nov. 24, 1970 |
| [73] | Assignee | Design Engineering Concepts Manufacturing Company San Jose, California a corporation of California |

[54] DOUBLE SECTION CAP WITH INTEGRATED DISPENSING VALVE
2 Claims, 6 Drawing Figs.

| [52] | U.S. Cl. | 222/548 |
| [51] | Int. Cl. | B65d 47/00 |
| [50] | Field of Search | 222/548 |

[56] References Cited
UNITED STATES PATENTS

| 1,042,448 | 10/1912 | Kane | 222/548 |
| 1,963,766 | 6/1934 | Stewart | 222/548 |
| 3,029,003 | 4/1962 | Gronemeyer | 222/548X |
| 3,198,406 | 8/1965 | Kopelman | 222/548X |

*Primary Examiner*—Stanley H. Tollberg
*Attorney*—Paul B. Fihe

ABSTRACT: A dispensing cap including a cup-shaped connector section arranged for screwed connection to the top of a container and a control section releasably attached to said connector section for relative rotation, said sections having a cooperating valve arrangement enabling dispensing upon appropriate relative rotation of said sections.

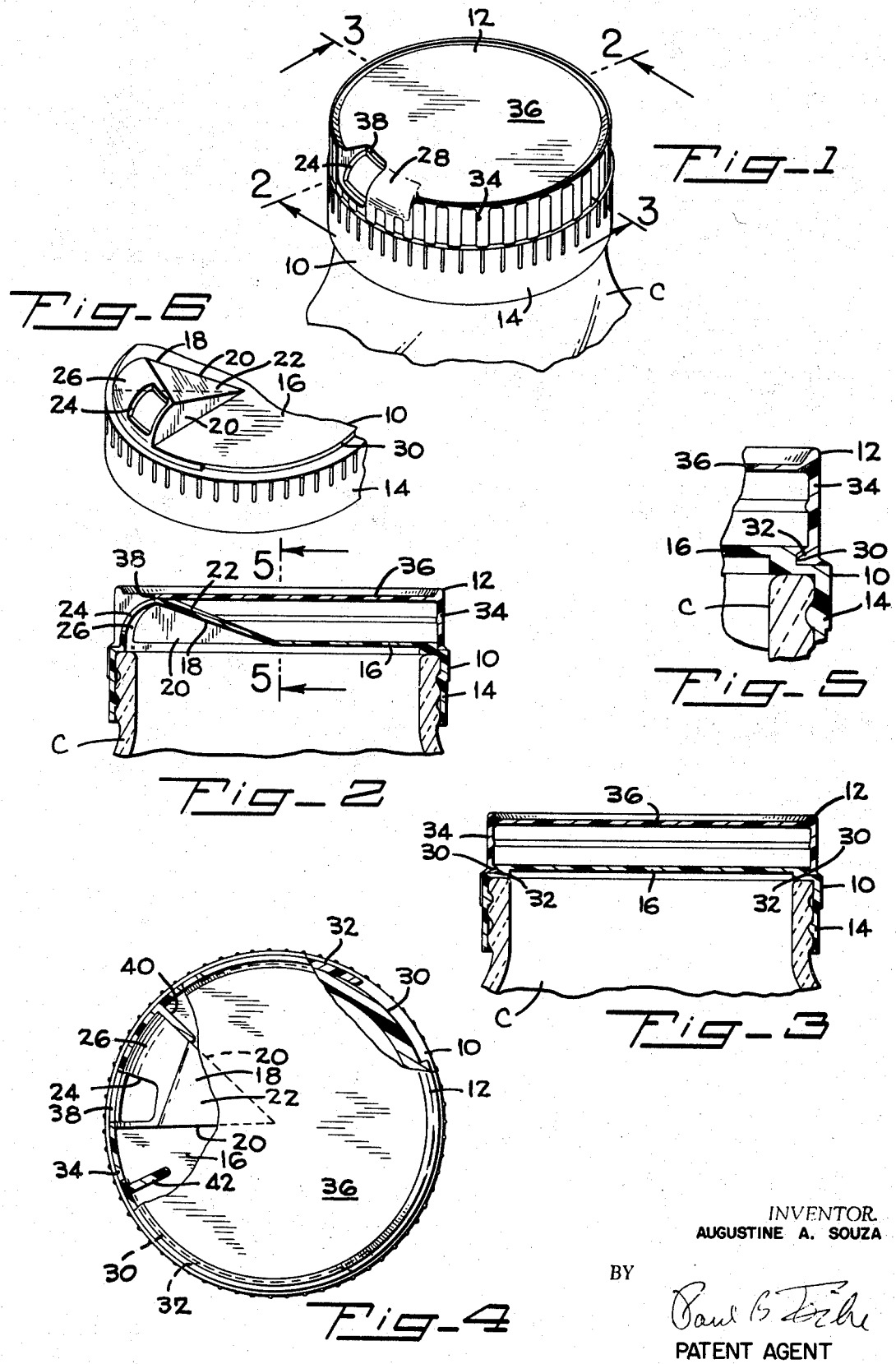

3,542,260

DOUBLE SECTION CAP WITH INTEGRATED DISPENSING VALVE

The present invention relates generally to dispensing mechanisms and more particularly to a dispensing cap adapted for attachment to a bottle or other container to control dispensing of material therefrom.

BACKGROUND OF THE INVENTION

Quite commonly, many fluent materials, liquids or dry granular material such as powdered coffee, are packaged in plastic or glass jars having a screw-connected cap which of course must be removed to provide access to the contents. Since the access opening is normally quite large, it becomes impractical to pour the fluent material from the opened jar or other container and some implement such as a spoon is commonly utilized to provide a controlled dispensing of the fluent contents.

SUMMARY OF THE INVENTION

Accordingly, it is the general objective of the present invention to provide a dispensing cap which can be applied to a glass jar or other container for powdered coffee or the like and thereafter operated to provide for controlled dispensing of the contents for utilization. In accordance with this objective, the cap is formed in two sections, one of which, which shall be denominated as the connecter section, takes the form of a shallow cup-shaped member which is interiorly threaded for application to the threaded neck of the glass jar or other container. A circular segment of the bottom of the connecter section is displaced to form a pocket at the outer side of which an opening is formed within a valve seat that is cooperatively arranged with a valve member formed in a corresponding position on a shallow cup-shaped control section supported for relative rotative motion on the connecter section. Such valve member surrounds an an opening which upon appropriate relative rotation of the control section can be brought into registry with the lateral opening in the connecter section thus to provide a direct material passage between the interior and exterior of the container. Since both openings are laterally disposed, complete inversion of the container to provide for dispensing is not required, and since the size of the openings can, of course, be controlled in accordance with the particular material to be dispensed, the passageway enables a directed dispensing of materials to a desired position.

BRIEF DESCRIPTION OF THE DRAWINGS

The foregoing objective and summary of the invention will be more readily understood by reference to the following detailed description of the exemplary structure shown in the accompanying drawings wherein:

FIG. 1 is a perspective view of a glass jar having a dispensing cap embodying the present invention applied thereto, FIG. 2 is an enlarged transverse cross-sectional view taken along line 2–2 of FIG. 1, showing details of the mentioned valve structure, FIG. 3 is another enlarged transverse cross-sectional view taken along the line 3–3 of FIG. 1 illustrating the interengagement of the two sections of the dispensing cap, FIG. 4 is a top plan view of the dispensing cap itself, portions of the structure being broken away to illustrate interior details, FIG. 5 is an enlarged fragmentary cross-sectional view taken along line 5–5 of FIG. 2 to illustrate more clearly the interengagement of the two cap sections, and FIG. 6 is an enlarged top perspective view of the connecter section of the dispensing cap with the control section removed therefrom.

DETAILED DESCRIPTION OF THE EXEMPLARY EMBODIMENT

With initial reference to FIG. 1 the illustrated container C is in the form of a large glass jar having a threaded neck portion adapted for screwed connection thereto of a standard cap or the dispensing cap of the present invention.

Quite generally, the dispensing cap as illustrated in more detail in FIGS. 2 through 6 includes two sections, a connecter section 10 which is arranged for screwed connection to the threaded neck portion of the container C and a control section 12 which is, in turn, attached to the connecter section 10 to function cooperatively therewith alternatively as an effective closure member or as a controlled dispensing mechanism.

More particularly, the connecter section 10 takes the form of a shallow cup having a cylindrical side wall 14 which is interiorly threaded to enable screwed connection to the threaded neck of the container C. The bottom 16 of the cup is of generally circular configuration and adjacent its perimeter is arranged to sealingly engage the lip of the container C to provide effective closure thereof when the screwed connection is fully made. One circular segment of the bottom 16 of the connecter section 10 is displaced from its otherwise planar disposition to form a pocket 18 which is defined by generally triangular side walls 20, each of which extends from its apex at approximately the center of the circular bottom 16 of the connecter section away from the plane of the circular bottom with its remote edge extending once again into the plane of the bottom 16 adjacent its outer perimeter, this edge of each triangle being preferably of concave configuration. The sloping edges and the outer curved edges of the triangular side walls 20 are joined by the bottom wall 22 of the pocket 18, as can be best visualized by reference to FIG. 6. An opening 24 is formed in the outer curved edge portion of the bottom wall thus enabling flow of material from the container C through the pocket 18 and through such opening 24 in a direction substantially laterally disposed relative to the general axis of the container and the described connecter section 10.

The described concave section of the pocket walls surrounding the lateral opening 24 forms a valve seat 26 which is cooperatively arranged with a slide valve member 28 on the mentioned control section 12 which is mounted on the connecter section 10 for relative rotation. To enable such rotative mounting of the control section 12, the peripheral edge of the bottom of the connecter section 10 is formed with diametrically opposed indentations 30, each of which extends through an arcuate extent of approximately 90° on opposite sides of the described pocket 18. As best shown in FIGS. 3 and 5 these indentations are arranged to receive diametrically opposed inwardly projecting flanges 32 at the lip of the control section 12 which, like the connecter Section, is of generally shallow cup-shaped configuration. The inwardly projecting flanges 32 extend only for an arcuate extent of approximately 45° so that the control section 12 can be rotated 45° relative to the connecter section without loss of connecting interengagement between the flanges on the control section and the corresponding indentations on the edge of the connecter section.

To facilitate assembly of the two section 10, 12, both are formed from integral molded plastic material having slight resiliently so that a mere pressing of the control section 12 over the connecter section 10 allows the flanges 32 to snap into position in the indentations 30 thus to render the assembly of the two sections an extremely simple operation.

As mentioned, the control section 12 has a generally cup-shaped configuration with a cylindrical side wall 34 integrally joined to a circular bottom wall 36 but for cooperative engagement with the valve seat 26 and associated opening 24 in the connecter section 10, a portion of the side wall and bottom wall of the control section is inwardly displaced to form the mentioned valve member 28 with an associated lateral opening 38 through a portion thereof which opening is arranged, upon appropriate relative rotation of the control section 12, to bring this opening into registry with the opening 24 in the valve seat 26 of the connecter section 10. When the two sections 10, 12 of the cap are brought into this position, it is quite clear that a slight tipping of the container will permit the flow of fluent contents of the container through the lateral passageway defined by the alined openings 24, 38.

A simple turning of the control section 12 effects a misalignment of the openings 24, 38 bringing the valve member 28 over the opening 24 in the valve seat 26 thus to effect closure of the dispensing cap wherefore further dispensing is precluded. The inner surface of the valve member 28 and the outer surface of the valve seat 26 are arranged to move in close sliding relationship so that all material is cleansed from the relatively slidable surfaces and, if powdered coffee or similar granular materials are to be dispensed, no impediment to the valve action is encountered.

Preferably, in order to facilitate quick alinement of the two lateral openings 24, 38 when dispensing is to be achieved, a pair of stop members 40, 42 are formed on the interior of the shallow cup-shaped control section 12 on opposite sides of the valve member 28 so as to be engaged by the side walls 20 of the pocket 18 of the connecter section after but limited relative rotary motion. The stops 40, 42 also preclude rotative displacement of the flanges 32 on the control section 12 from their interengaging relationship with the mating indentations on the connecter section 10, thus to preclude accidental separation of the two sections.

As previously indicated, each of the sections can be formed in a single plastic molding operation in spite of various structural contours required to form the various operative elements of the sections, and since the plastic material can be slightly resilient, the mentioned ease of assembly of the two sections is readily achieved.

I claim:

1. A dispensing cap which comprises:

a connecter section adapted for attachment to a container from which material is to be dispensed and having a valve seat surrounding a lateral dispensing opening;

a control section movably joined to said connecter section and having a valve member adjacent a lateral opening therein disposed for movement adjacent said valve seat to enable registry of said lateral openings and dispensing of material therethrough upon appropriate manual positioning of the container;

said connecter section being in the form of a shallow cup having a cylindrical side wall and a generally circular bottom wall with a displaced portion forming a pocket in a lateral portion of which said lateral dispensing opening is formed; and said control section generally having the form of a shallow cup which is joined to said connecter section for relative rotation and includes a side wall and bottom wall inwardly displaced at one portion to form said valve member which moves closely adjacent said valve seat during such relative rotation.

2. A dispensing cap which comprises:

a connecter section adapted for attachment to a container from which material is to be dispensed and having a valve seat surrounding a lateral dispensing opening;

a control section movably joined to said connecter section and having a valve member adjacent a lateral opening therein disposed for movement adjacent said valve seat to enable registry of said lateral openings and dispensing of material therethrough upon appropriate manual positioning of the container;

said connecter section being in the form of a shallow cup having cylindrical side wall and a generally circular bottom wall with a displaced portion forming a pocket in a lateral portion of which said lateral dispensing opening is formed;

said control section being joined to said connecter section for relative rotation and said valve member moving closely adjacent said valve seat during such relative rotation; and a pair of stops on said control section on opposite sides of said valve member and engageable with opposite surfaces of said pocket to limit relative rotation of said sections.